(No Model.) 2 Sheets—Sheet 1.

S. H. McBRIDE.
WEED EXTERMINATOR.

No. 593,235. Patented Nov. 9, 1897.

(No Model.) 2 Sheets—Sheet 2.

S. H. McBRIDE.
WEED EXTERMINATOR.

No. 593,235. Patented Nov. 9, 1897.

UNITED STATES PATENT OFFICE.

SAMUEL H. McBRIDE, OF OAK CLIFF, TEXAS.

WEED-EXTERMINATOR.

SPECIFICATION forming part of Letters Patent No. 593,235, dated November 9, 1897.

Application filed September 8, 1896. Serial No. 605,135. (No model.)

*To all whom it may concern:*

Be it known that I, SAMUEL H. MCBRIDE, a citizen of the United States, residing at Oak Cliff, in the county of Dallas and State of Texas, have invented a new and useful Improvement in Johnson-Grass, other Grass, and Weed Exterminators, of which the following is a specification.

My invention relates to improvements in Johnson-grass, other grass, and weed exterminators, in which a current of electricity passes through the mowing-blade, (while in the operation of mowing,) thus charging the stubs and roots with the electric fluid, which causes them to die.

My invention consists in the combination of an electric dynamo and other necessary appliances with an ordinary grass or hay mower. The power necessary to produce the electricity generated by the dynamo is had by the revolution of one of the ground-wheels of the mower, which is provided with cogs operated on a small pinion-wheel carried by a shaft to which is secured a band-wheel provided with a band which operates on the pulley-wheel of the dynamo. I attain these objects by the mechanism illustrated in the accompanying drawings, in which—

Figure 1:
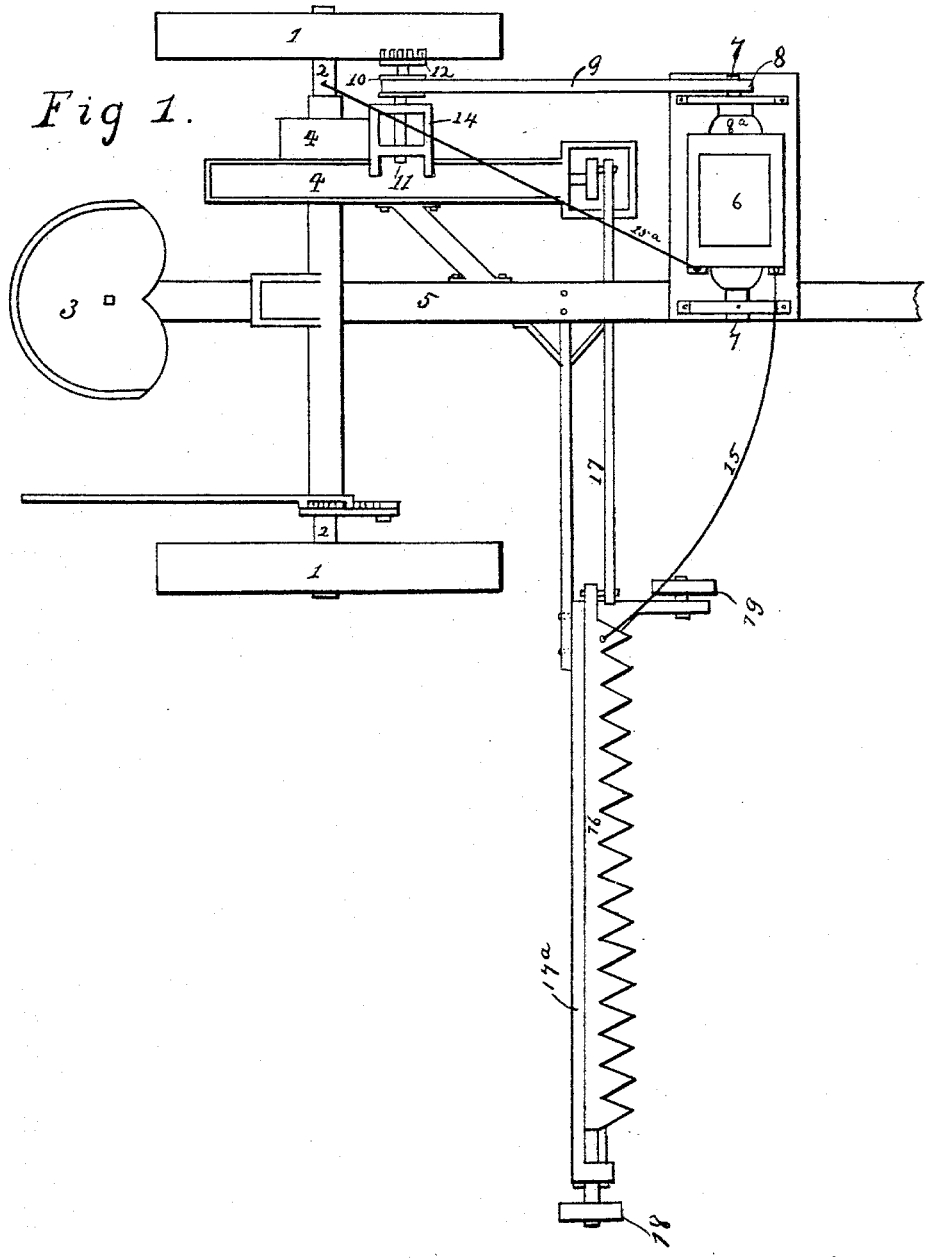
Figure 2:
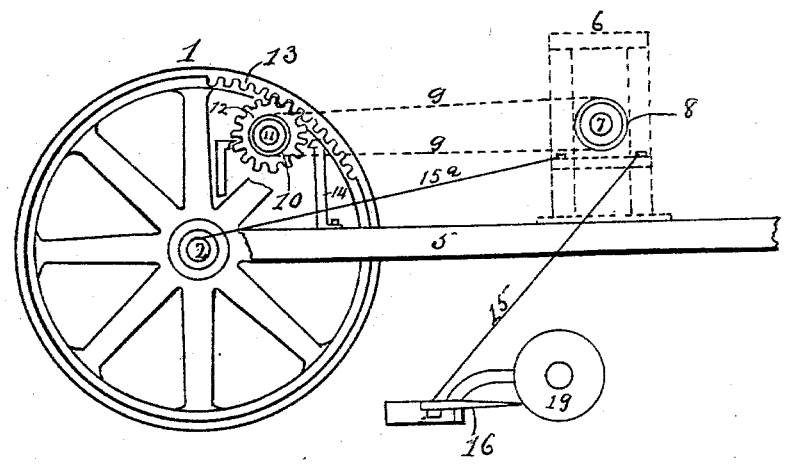

Figure 1 is a plan view of the device complete. Fig. 2 is a vertical section (in part) through Fig. 1, the outline of the dynamo being shown in dotted lines.

Similar numerals of reference refer to similar parts throughout the two views.

The numeral 1 are the ground-wheels of the mower engaging the axle 2, which supports the seat 3, gearing-frame 4, and tongue 5, which carries the dynamo 6, provided with an axle 7, to which is rigidly secured a pulley 8, engaging a band 9, which operates on a band-wheel 10, secured to shaft 11, which has secured at one end a pinion-wheel 12, which is turned by cogs 13 on the ground-wheel 1, the shaft 11 being supported by frame 14, which rests on gear-frame 4.

As to the operation of my device, as the ground-wheel 1 revolves on the ground the cogs 13 engage the pinion-wheel 12, which is secured to a shaft 11, which revolves the band-wheel 10, which is connected by a band 9 with the pulley 8, which revolves the drum $8^a$ of the dynamo, thus producing the required amount of electricity. The dynamo has attached thereto a positive wire 15, which is also connected with the mowing-blade 16, which is oscillated back and forth by the pitman 17, which receives its motion from the machinery of the mower. It will be observed that frame $17^a$, which carries the mowing-blade, is supported by two wheels 18 and 19, which are of non-conducting material, which prevent the current of electricity charging the blade from running into the ground, leaving no other escape of the electric fluid except when the blade comes in contact with the grass or weeds, which passes down into the roots, thus killing them.

It is understood that the blade 16 is suitably insulated from the rest of the machine, which may be done by making the pitman 17, or its connection with the blade 16 or with the machinery of the mower or any two or all of the parts, of insulating material. It will also be seen that by suitably proportioning the number of teeth in the gear-wheels and the diameters of the coacting pulleys a speed of many hundred revolutions per minute in the dynamo may be attained, sufficient, with proper winding of the electromagnets thereof, to produce as high a voltage as is necessary to destroy the noxious vegetation.

An important feature of my invention is that the destructive electric current is used in connection with a cutting-blade. This is of the greatest importance, as the object of the invention is to kill the roots of the noxious vegetation. If the electric current were discharged by means of a brush moved along the surface of the ground, it would travel to the ground along the outside of the stalks of grass or other vegetation and on reaching the ground would dissipate without traversing or affecting the roots; but by my machine the electric current is caused to travel down to the roots by means of the sap of the grass or vegetation and reaches the most vital part of the roots—namely, that at which said roots are in contact with the moist ground. Thus the roots are attacked by the electric current at the point where they are at once the weakest and where the current produces the greatest effect.

The dynamo has also connected a negative ground-wire 15ª, which is also connected with the axle 2, which transmits the current to the ground through the ground-wheel 1.

Having thus explained all that is necessary for the understanding of those skilled in the art to which it appertains, what I claim, and desire to secure by Letters Patent of the United States, is—

1. The combination with a traveling machine having an electrically-insulated cutting-blade for mowing grass, of a dynamo, means for operating the dynamo, and connections from one pole of the dynamo to the cutting-blade and from the other pole to the earth, substantially as described.

2. The combination, with a traveling machine having an electrically-insulated cutting-blade for mowing grass, of a dynamo, an operative connection with one of the wheels of the machine for driving the dynamo, and connections from one pole of the dynamo to the cutting-blade, and from the other pole to the earth, substantially as described.

SAMUEL H. McBRIDE.

Witnesses:
W. F. DOUGHERTY,
FRANK H. JINKS.